(12) United States Patent
Wang

(10) Patent No.: US 7,075,976 B1
(45) Date of Patent: Jul. 11, 2006

(54) TRI-STATE TRANSMITTER

(75) Inventor: Li T Wang, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 946 days.

(21) Appl. No.: 09/813,042

(22) Filed: Mar. 19, 2001

(51) Int. Cl.
*H04B 1/38* (2006.01)

(52) U.S. Cl. ........................................ 375/219; 326/56

(58) Field of Classification Search ........ 375/219–220, 375/257, 295, 377; 327/407, 410, 185, 211, 327/212, 408, 409; 326/56–59, 85, 86, 87
See application file for complete search history.

(56) References Cited

U.S. PATENT DOCUMENTS

| | | | | |
|---|---|---|---|---|
| 3,792,292 A * | 2/1974 | Priel | ............................ | 326/56 |
| 5,027,012 A | 6/1991 | Saeki et al. | .................. | 307/465 |
| 5,075,577 A | 12/1991 | Okitaka | ....................... | 307/473 |
| 5,371,424 A * | 12/1994 | Quigley et al. | ................ | 326/63 |
| 5,399,925 A | 3/1995 | Nguyen | ......................... | 326/58 |
| 5,500,817 A | 3/1996 | McLaury | ................ | 365/189.05 |
| 5,680,071 A | 10/1997 | Senoh et al. | ................. | 327/390 |
| 5,767,696 A * | 6/1998 | Choi | ............................ | 326/56 |
| 5,793,506 A * | 8/1998 | Schmid | ....................... | 398/72 |
| 5,864,584 A * | 1/1999 | Cao et al. | .................... | 375/244 |
| 5,867,053 A * | 2/1999 | Engles et al. | ................ | 327/407 |
| 5,883,527 A | 3/1999 | Saito | ........................... | 326/58 |
| 5,986,473 A * | 11/1999 | Krishnamurthy et al. | ..... | 326/83 |
| 6,037,802 A | 3/2000 | Watarai | ....................... | 326/84 |
| 6,072,333 A * | 6/2000 | Tsukagoshi et al. | .......... | 326/58 |
| 6,160,421 A * | 12/2000 | Barna | .......................... | 326/63 |
| 6,181,166 B1 | 1/2001 | Krishnamurthy et al. | ..... | 326/83 |
| 6,320,441 B1 * | 11/2001 | Fletcher et al. | ............. | 327/211 |
| 6,366,122 B1 * | 4/2002 | Krishnamurthy et al. | ..... | 326/56 |
| 6,446,195 B1 * | 9/2002 | Ganapathy et al. | ......... | 712/221 |
| 6,459,299 B1 | 10/2002 | Hirano et al. | ................. | 326/56 |
| 6,470,054 B1 * | 10/2002 | Boudry et al. | .............. | 375/257 |

* cited by examiner

*Primary Examiner*—Khanh Tran
(74) *Attorney, Agent, or Firm*—Baker Botts L.L.P.

(57) ABSTRACT

A tri-state transmitter drives a data line to a first state if a first data signal is a logic zero and releases the data line to a second state if the first data signal is a logic one. The tri-state transmitter also drives the released data line to a third state if the first data signal is a logic one and the second data signal is a logic one.

23 Claims, 1 Drawing Sheet

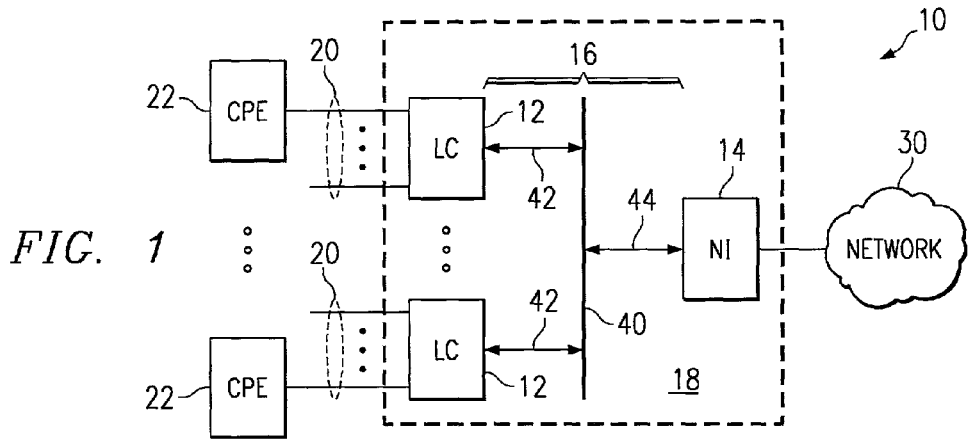
FIG. 1
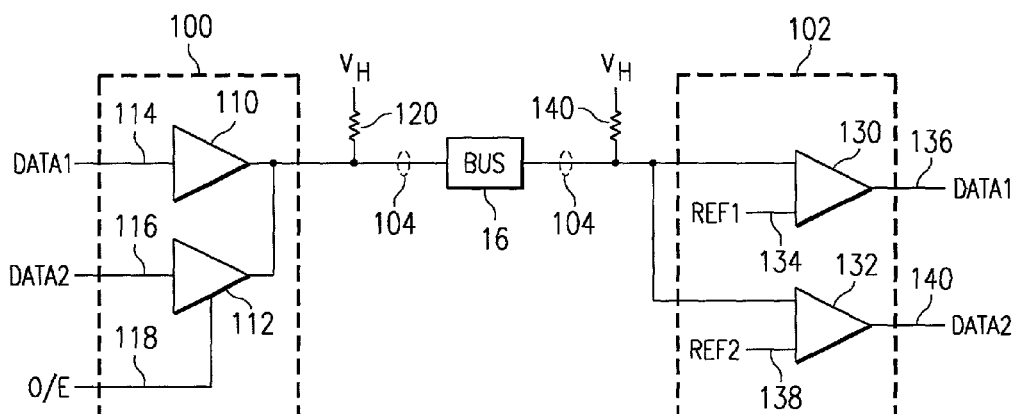
FIG. 2
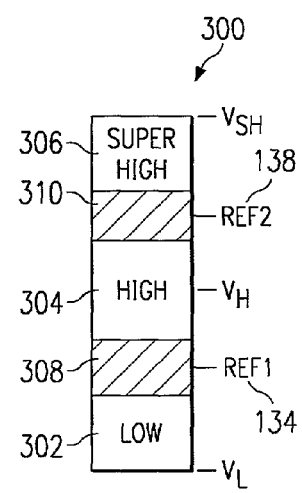
FIG. 3
FIG. 4

TRI-STATE TRANSMITTER

TECHNICAL FIELD OF THE INVENTION

The present invention relates generally to communications, and more particularly to a tri-state transmitter.

BACKGROUND OF THE INVENTION

Traditional binary logic circuits communicate information using two states that include a low voltage state or logic zero and a high voltage state or logic one. Using predetermined voltage levels for logic zero and logic one, these circuits communicate information at a given clock speed, where each cycle of the clock may represent a logic one or a logic zero. Several binary logic standards such as Gunning Transceiver Logic (GTL) and Stub Series Terminated Logic (SSTL) define the different voltage levels and timing requirements to allow receivers to resolve the logic zero and logic one signals.

Given a fixed number of data lines and a predetermined clock frequency, the amount of information communicated by existing binary logic standards is limited. The allowed bandwidth on existing data lines using binary logic may be insufficient to satisfy increasing capacity demands in a variety of communication systems. Moreover, current approaches may not allow both an increase in the amount of data for communication on a data line as well as backwards compatibility to existing binary logic standards.

SUMMARY OF THE INVENTION

In accordance with the present invention, techniques for tri-state communication are provided which substantially eliminate or reduce disadvantages and problems associated with previous techniques. In a particular embodiment, the present invention satisfies a need for increasing bandwidth on existing data lines using a tri-state transmitter, while supporting existing binary logic standards.

According to one embodiment of the present invention a method for tri-state signal communication comprises: providing a first data signal; providing a second data signal; driving a data line to a first state if the first data signal is a logic zero; releasing the data line to a second state if the first data signal is a logic one; and driving the released data line to a third state if the first data signal is a logic one and the second data signal is a logic one.

According to another embodiment of the present invention, a tri-state transmitter includes a first amplifier operable to receive a first data signal. The first amplifier drives a data line to a first state if the first data signal is a logic zero and releases the data line to a second state if the first data signal is a logic one. A second amplifier receives a second data signal and drives the released data line to a third state if the first data signal is a logic one and the second data signal is a logic one.

Various embodiments of the present invention provide numerous technical advantages. In a particular embodiment, a tri-state transmitter increases the amount of information communicated over an existing data line without changing clock frequency. Furthermore, the tri-state transmitter implements its functionality using existing binary logic standards to ensure backwards compatibility with devices that only implement a particular binary logic standard. As a result, communication devices can increase data throughput without changing the number of data lines or the clock frequency while still supporting existing binary logic standards. Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 1 illustrates a communication system that incorporates embodiments of the present invention;

FIG. 2 illustrates a tri-state transmitter and receiver in the communication system;

FIG. 3 is a table illustrating the different states of signals generated by the tri-state transmitter; and FIG. 4 is a graph illustrating the various voltage levels and states of the tri-state transmitter.

DETAILED DESCRIPTION OF THE INVENTION

FIG. 1 illustrates a communication system 10 that includes a number of linecards 12 coupled to a network interface card 14 using bus 16. In a particular embodiment, linecards 12 and/or network interface 14 include tri-state transmitters that communicate information using bus 16. Linecards 12, network interface 14, and bus 16 may be components of a communication server 18, such as a digital subscriber line access mutliplexer (DSLAM) that provides broadband data services to customers.

Each linecard 12 includes a number of subscriber lines 20 that, directly or through intermediate components, couple linecard 12 to customer premises equipment (CPE) 22. CPE 22 allows customers to receive a variety of communication services that allow for the exchange of voice, video, data, and other information (generally referred to as media) between CPE 22 and communication server 18. Communication server 18 may include any number of linecards 12 to service customers in communication system 10. In a particular embodiment where communication server 18 is a DSLAM, customer lines are shielded or unshielded twisted pair lines that couple linecard 12 to CPE 22. Linecard 12 and CPE 22 may then exchange media using any appropriate digital subscriber line technology, generally referred to as XDSL. For example, communication server 18 may support asymmetric digital subscriber line (ADSL), symmetric digital subscriber line (SDSL), high-speed digital subscriber line (HDSL), very high-speed digital subscriber line (VDSL), or any other suitable technology that allows high rate data service over twisted pair wiring. Communication system 10 contemplates any hardware and/or software components and technologies to support any form of communication between linecards 12 and CPE 22.

Network interface 14 includes any appropriate hardware and/or software that allows for the exchange of media between linecards 12 and network 30. Network 30 may be one or more hardware and/or software components that together establish a local area network (LAN), wide area network (WAN), global distributed network such as the Internet, intranet, extranet, or any other form of wireless or wireline communication network. In one embodiment, network 30 provides for the communication of packets, cells, frames, or other portion of information (generally referred to a packets), and may include any combination of routers, hubs, switches, and other hardware and/or software implementing any number of communication protocols that allow for the exchange of packets in communication system 10. Network 30 may also include components of the public switched telephone network (PSTN), or other dedicated voice network, as well as any gateways or other devices to access those networks.

Bus 16 allows for the exchange of media between linecards 12 and network interface 14. In a particular embodiment, bus 16 includes a backplane 40 that carries signals between components in communication server 18. Each component, such as linecards 12 and network interface 14, couples to backplane 40 using a physical interface that establishes conductive traces between linecards 12 and network interfaces 14. For example, each linecard 12 may have a physical interface 42 that couples to bus 40, and network interface may have a physical interface 44 that couples to backplane 40. Although bus 16 has been described as including backplane 40 and physical interfaces 42 and 44, bus 16 contemplates any form or arrangement of components that allows the establishment of conductive couplings between linecards 12 and network interface 14 to exchange data using tri-state transmitters.

Linecards 12 and network interface 14 implementing tri-state transmitters provide several advantages. In a particular embodiment, assume that data transfer using bus 16 between a single linecard 12 and network interface 14 uses eight data lines established by interfaces 42, 44 and backplane 40. In this example, exchange of information between linecard 12 and network interface 14 is accomplished using eight data lines. Also, assume that these data lines operate at a given or maximum clock frequency. Using existing binary logic standards, such as Gunning Transceiver Logic (GTL) or Stub Series Terminated Logic (SSTL), communication server 18 can support a given fixed rate of communication bandwidth between linecard 12 and network interface 14. Tri-state transmitters incorporated into linecards 12 and/or network interface 14 allows communication server 18 to support higher bandwidth communication on bus 16 without increasing clock frequency, while still using existing binary logic standards. One particular embodiment of tri-state transmitters allows communication server 18 to be backwards compatible with linecards 12 that may not implement tri-state transmitters.

FIG. 2 illustrates in more detail a tri-state transmitter 100 and a tri-state receiver 102 that can communicate information using bus 16. For data communicated from linecard 12 to network interface 14, linecard 12 includes transmitter 100 and network interface 14 includes receiver 102. Similarly, for data communicated from network interface 14 to linecard 12, network interface 14 includes transmitter 100 and linecard 12 includes receiver 102. Each transmitter/receiver pair operates to communicate information in one direction using one of data lines 104 supported by bus 16. Communication system 10 contemplates any number and arrangement of transmitter/receiver pairs to communicate media unidirectionally or bidirectionally using bus 16.

Transmitter 100 includes a first amplifier 110 and a second amplifier 112. First amplifier 110 receives a first data signal 114, and amplifier 112 receives a second data signal 116 and/or an output enable 118 (generally referred to singularly or in combination as second data signal). The outputs of amplifiers 110 and 112 couple to data line 104. A pull-up resistor 120 couples data line 104 to a high voltage level ($V_H$). In a particular embodiment, first amplifier 110 operates in accordance with an open drain binary logic standard, such as GTL. In this embodiment, first data signal 114 having a logic zero causes first amplifier 110 to pull down data line 104 towards a zero voltage. A logic one on first data signal 114 causes first amplifier 110 to establish an open drain on its output, effectively releasing data line 104. In this particular embodiment, second amplifier 112 may implement a different standard, such as SSTL, that drives data line 104 when second data signal 116 is a logic one and output enable 118 is enabled. The combination of first amplifier 110 as an open drain implementation for logic one, and second amplifier 112 as a driving implementation for a logic one allows tri-state transmitter 100 to achieve three different states in its operation.

In a first state, first data signal 114 is a logic zero and second data signal 116 (and/or output enable 118) is a logic zero, and first amplifier 110 drives data line 104 from $V_H$ towards a zero voltage. For the second state, first data signal 114 is a logic one and second data signal 116 (and/or output enable 118) are again a logic zero, and first amplifier 110 establishes an open drain state, releasing data line 104 to transition towards a voltage level $V_H$. For the third state, first data signal 114 is a logic one and second data signal 116 and output enable 118 are a logic one, which causes second amplifier 112 to drive data line 104 to a super-high voltage level ($V_{SH}$), where $V_H$ is between the zero voltage level and $V_{SH}$. In this third state, first amplifier 110 releases the line allowing second amplifier 112 to drive the line towards $V_{SH}$.

Receiver 102 includes a first comparator 130 and a second comparator 132. First comparator 130 has two inputs coupled to data line 104 and a first reference voltage (REF1) 134, respectively, and an output representing a first received data signal 136. Similarly, comparator 132 has two inputs coupled to data line 104 and a second reference voltage (REF2) 138, respectively, and an output representing a second received data signal 140. A pull-up resistor 140 couples data line 104 on the receive side to voltage $V_H$.

In operation, receiver 102 utilizes comparators 130 and 132 to resolve the three voltage levels representing the three states of data line 104. For the first state, comparator 130 determines that the voltage on data line 104 is below REF1 134, and outputs a logic zero as first received data signal 136. Similarly, second comparator 132 also determines that the voltage on data line 104 is below REF2 138, and outputs a logic zero on second received data signal 140. In the second state, comparators 130 and 132 determine that the voltage on data line 104 is above REF1 134 but below REF2 138, and output a logic one for first received data signal 136 and a logic zero for second received data signal 140. In the third state, comparators 130 and 132 determine that the voltage on data line 104 is above both REF1 134 and REF2 138, and output a logic one for both first received data signal 136 and second received data signal 140. Although receiver 102 resolves the three states of data line 104 using two comparators, receiver 102 may use totem poles, voltage divide circuits, or any other suitable circuitry and/or techniques to resolve these voltages.

FIG. 3 illustrates table 200 that includes a state 202, transmit data signal 204, bus voltage 206, and receive data signal 208 for each of the three states achievable by a tri-state transmitter/receiver pair. For example, entry 210 specifying a high state, is achieved by setting first data signal 114 to a logic one and leaving second data signal 116 a logic zero, or not enabled, which may be referred to as "open". This results in an approximate bus voltage of 1.2V, resulting in first received data signal 136 having a logic one and second received data signal 140 having a logic zero. Although table 200 illustrates particular data and voltage settings, communication system 10 contemplates any number and arrangements of states, data settings, and/or voltages to accomplish tri-state data communication.

FIG. 4 is a graph 300 of various voltage levels on data line 104 to achieve tri-state operation. Graph 300 illustrates a low state 302, a high state 304, and a super-high state 306, each separated by decision regions 308 and 310. Voltage level $V_L$ corresponds to a nominal value for low state 302. Similarly, voltage level $V_H$ corresponds to a nominal voltage for state 304, and $V_{SH}$ corresponds to a nominal voltage for state 306. First comparator 130 uses a nominal or average first reference voltage (REF1) 134 to resolve voltages on data line 104 between state 302 and 304. Similarly, second comparator 132 uses a nominal or average second reference voltage (REF2) 138 to resolve voltages on data line 104 between state 304 and state 306.

In a particular embodiment, these voltages levels and references, while implementing tri-state operation, may correspond to or be compatible with existing binary logic voltage level standards. For example, low state 302, high state 304, and first reference voltage 134 may correspond to voltage levels and references used in GTL circuitry. Furthermore, super-high state 306 and second reference voltage 138 may correspond to a high state supported by another binary logic standard, such as SSTL. One particular advantage of communication system 10 is the use of two existing binary logic standards in a stacked manner to produce a voltage reference map that allows tri-state operation while still supporting backwards compatibility with existing binary logic standards. For the particular embodiment described using both GTL and SSTL standards, $V_L$ equals 0.4V, $V_H$ equals 1.2V, and $V_{SH}$ equals 2.3V. Also in this embodiment, first reference voltage 134 is approximately 0.8V and second reference voltage 138 is approximately 1.7V. Communication system 10 contemplates any other levels or polarity of voltages to accomplish tri-state operation.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for tri-state signal communication, comprising:
   providing a first data signal;
   providing a second data signal;
   driving a data line to a first voltage state if the first data signal is a logic zero;
   releasing the data line to a second voltage state if the first data signal is a logic one, wherein releasing the data line to a second voltage state comprises placing an output of an amplifier coupled to the data line into an open drain state; and
   driving the released data line to a third voltage state if the first data signal is a logic one and the second data signal is a logic one.

2. The method of claim 1, wherein the data line is coupled to a first voltage level using a pull-up resistor, and driving a data line to a first voltage state comprises pulling voltage of the data line from the first voltage level towards a zero voltage level.

3. The method of claim 1, wherein driving the released data line to a third voltage state comprises:
   placing an output of a first amplifier coupled to the data line into an open drain state; and
   driving a second amplifier coupled to the data line.

4. The method of claim 1, wherein the data line is coupled to a first voltage level using a pull-up resistor, and driving the released data line to a third voltage state comprises:
   placing an output of a first amplifier coupled to the data line into an open drain state; and
   driving a second amplifier coupled to the data line to transition voltage of the data line from the first voltage level to a second voltage level representing the third voltage state.

5. The method of claim 4, wherein:
   the first amplifier comprises an open drain Gunning Transceiver Logic (GTL) buffer; and
   the second amplifier comprises a Stub Series Terminated Logic (SSTL) output driver.

6. The method of claim 1, wherein:
   the first voltage state comprises an approximate 0.4 voltage level on the data line;
   the second voltage state comprises an approximate 1.2 voltage level on the data line; and
   the third voltage state comprises an approximate 2.3 voltage level on the data line.

7. A tri-state transmitter comprising:
   a first amplifier operable to receive a first data signal, the first amplifier operable to drive a data line to a first voltage state if the first data signal is a logic zero, the first amplifier further operable to release the data line to a second voltage state if the first data signal is a logic one, wherein the first amplifier establishes an open drain state on its output to release the data line to the second voltage state; and
   a second amplifier operable to receive a second data signal, the second amplifier operable to drive the released data line to a third voltage state if the first data signal is a logic one and the second data signal is a logic one.

8. The tri-state transmitter of claim 7, further comprising a pull-up resistor coupling the data line to a first voltage level, wherein the first amplifier drives the data line to the first voltage state by pulling voltage of the data line from the first voltage level towards a zero voltage level.

9. The tri-state transmitter of claim 7, herein the first amplifier establishes an open drain state to release the data line so that the second amplifier can drive the data line to the third voltage state.

10. The tri-state transmitter of claim 7, further comprising a pull-up resistor coupling the data line to a first voltage level, wherein the first amplifier establishes an open drain state to release the data line so that the second amplifier can drive the data line to a third voltage state represented by a second voltage level, the first voltage level being between the second voltage level and a zero voltage level.

11. The tri-state transmitter claim 7, wherein:
   the first amplifier comprises an open drain Gunning Transceiver Logic (GTL) buffer; and
   the second amplifier comprises a Stub Series Terminated Logic (SSTL) output driver.

12. The tri-state transmitter of claim 7, wherein:
   the first voltage state comprises an approximate 0.4 voltage level on the data line;
   the second voltage state comprises an approximate 1.2 voltage level on the data line; and
   the third voltage state comprises an approximate 2.3 voltage level on the data line.

13. An apparatus for tri-state signal communication, comprising:
   means for providing a first data signal;
   means for providing a second data signal;

means for driving a data line to a first voltage state if the first data signal is a logic zero;

means for releasing the data line to a second voltage state if the first data signal is a logic one, wherein means for releasing the data line to the second voltage state comprises means for placing an output of an amplifier coupled to the data line into an open drain state; and means for driving the released data line to a third voltage state if the first data signal is a logic one and the second data signal is a logic one.

14. The apparatus of claim 13, wherein the data line is coupled to a first voltage level using a pull-up resistor, and means for driving the released data line to a third voltage state comprises:

means for placing an output of a first amplifier coupled to the data line into an open drain state; and means for driving a second amplifier coupled to the data line to transition voltage of the data line from the first voltage level to a second voltage level representing the third voltage state.

15. The apparatus of claim 13, wherein:

the means for driving a data line comprises an open drain Gunning Transceiver Logic (GTL) buffer; and the means for driving the released data line comprises a Stub Series Terminated Logic (SSTL) output driver.

16. The apparatus of claim 13, wherein:

the first voltage state comprises an approximate 0.4 voltage level on the data line;

the second voltage state comprises an approximate 1.2 voltage level on the data line; and the third voltage state comprises an approximate 2.3 voltage level on the data line.

17. A communication server comprising:

a network interface operable to communicate with a data network;

at least one linecard coupled to the network interface, the linecard operable to couple to customer premises equipment to deliver data services to the customers; and a bus coupling the network interface to the linecard, the bus comprising a plurality of tri-state transmitter/receiver pairs, each transmitter/receiver pair comprising:

a first amplifier operable to receive a first data signal, the first amplifier operable to drive a data line to a first state if the first data signal is a logic zero, the first amplifier further operable to release the data line to a second state if the first data signal is a logic one;

a second amplifier operable to receive a second data signal, the second amplifier operable to drive the released data line to a third state if the first data signal is logic one and the second data signal is a logic one; and a receiver operable to resolve voltages on the data line to determine if the data line is in the first state, the second state, or the third state.

18. The communication server of claim 17, wherein the linecard supports XDSL communication with customer premises equipment.

19. The communication server of claim 17, wherein the bus comprises:

a backplane;

a first physical interface that couples the network interface to the backplane; and a second physical interface that couples the linecard to the backplane.

20. A method for tri-state signal communication, comprising:

providing a first data signal;

providing a second data signal;

driving a data line to a first voltage state if the first data signal is a logic zero, wherein the data line is coupled to a first voltage level using a pull-up resistor, and driving a data line to a first voltage state comprises pulling voltage of the data line from the first voltage level towards a zero voltage level;

releasing the data line to a second voltage state if the first data signal is a logic one; and driving the released data line to a third voltage state if the first data signal is a logic one and the second data signal is a logic one.

21. A method for tri-state signal communication, comprising:

providing a first data signal;

providing a second data signal;

driving a data line to a first voltage state if the first data signal is a logic zero;

releasing the data line to a second voltage state if the first data signal is a logic one; and driving the released data line to a third voltage state if the first data signal is a logic one and the second data signal is a logic one, wherein driving the released data line to the third voltage state comprises:

placing an output of a first amplifier coupled to the data line into an open drain state; and driving a second amplifier coupled to the data line.

22. A tri-state transmitter comprising:

a first amplifier operable to receive a first data signal, the first amplifier operable to drive a data line to a first voltage state if the first data signal is a logic zero, the first amplifier further operable to release the data line to a second voltage state if the first data signal is a logic one;

a pull-up resistor coupling the data line to a first voltage level, wherein the first amplifier drives the data line to the first voltage state by pulling voltage of the data line from the first voltage level towards a zero voltage level; and a second amplifier operable to receive a second data signal, the second amplifier operable to drive the released data line to a third voltage state if the first data signal is a logic one and the second data signal is a logic one.

23. A tri-state transmitter comprising:

a first amplifier operable to receive a first data signal, the first amplifier operable to drive a data line to a first voltage state if the first data signal is a logic zero, the first amplifier further operable to release the data line to a second voltage state if the first data signal is a logic one, wherein the first amplifier establishes an open drain state to release the data line so that the second amplifier can drive the data line to the third voltage state; and a second amplifier operable to receive a second data signal, the second amplifier operable to drive the released data line to a third voltage state if the first data signal is a logic one and the second data signal is a logic one.

* * * * *